(12) United States Patent
Yamashita

(10) Patent No.: US 11,315,139 B2
(45) Date of Patent: Apr. 26, 2022

(54) SYSTEMS AND METHODS FOR OVERPAYMENT HANDLING

(71) Applicant: Capital One Services, LLC, McLean, VA (US)

(72) Inventor: Mark Yamashita, Toronto (CA)

(73) Assignee: CAPITAL ONE SERVICES, LLC, Mclean, VA (US)

(*) Notice: Subject to any disclaimer, the term of this patent is extended or adjusted under 35 U.S.C. 154(b) by 14 days.

(21) Appl. No.: 16/569,808

(22) Filed: Sep. 13, 2019

(65) Prior Publication Data

US 2021/0081984 A1 Mar. 18, 2021

(51) Int. Cl.
| G06Q 30/00 | (2012.01) |
| G06Q 30/02 | (2012.01) |
| G06N 20/00 | (2019.01) |
| G06Q 20/10 | (2012.01) |

(52) U.S. Cl.
CPC ......... *G06Q 30/0238* (2013.01); *G06N 20/00* (2019.01); *G06Q 20/102* (2013.01); *G06Q 30/0215* (2013.01)

(58) Field of Classification Search
CPC ............. G06Q 30/0238; G06Q 20/102; G06Q 30/0215; G06N 20/00
USPC .............................................. 705/14.1–14.73
See application file for complete search history.

(56) References Cited

U.S. PATENT DOCUMENTS

| 5,956,700 A | 9/1999 | Landry |
| 6,088,682 A | 7/2000 | Burke |
| 6,112,191 A | 8/2000 | Burke |
| 6,311,170 B1 | 10/2001 | Embrey |
| 7,117,172 B1 | 10/2006 | Black |
| 7,318,046 B1 | 1/2008 | Wellons et al. |
| 7,353,203 B1 | 4/2008 | Kriplani et al. |
| 7,818,188 B1 | 10/2010 | Allsup et al. |

(Continued)

FOREIGN PATENT DOCUMENTS

CA 2252638 10/1998

OTHER PUBLICATIONS

Cui, Wong, and Lui: Machine Learning for Direct Marketing Response Models 598 Management Science 52(4), pp. 597-612, 2006.*

*Primary Examiner* — Ilana L Spar
*Assistant Examiner* — Allan J Woodworth, II
(74) *Attorney, Agent, or Firm* — Hunton Andrews Kurth LLP

(57) ABSTRACT

A method and system for handling overpayment may include an account database containing account information for one or more accounts associated with a user, and the one or more accounts may include a first account associated with the user and the account information includes a balance reflecting liabilities and pending transactions for the first account. A method and system for handling overpayment may include an offer database containing offer information, the offer information including one or more enhancements relating to one or more additional accounts. A method and system for handling overpayment may include a server containing a processor. Upon receiving payment funds that exceed the balance of the first account, the processor may apply a portion of the payment funds equal to the balance of the first account and query the offer database for one or more enhancements applicable to the one or more additional accounts.

20 Claims, 9 Drawing Sheets

System (100)

(56) References Cited

U.S. PATENT DOCUMENTS

| | | |
|---|---|---|
| 8,036,987 B1 | 10/2011 | Grbac et al. |
| 8,280,787 B1 | 10/2012 | Gandhi |
| 8,712,887 B2 | 4/2014 | DeGroeve et al. |
| 9,129,268 B2 | 9/2015 | Hazlehurst |
| 2002/0029194 A1 | 3/2002 | Lewis et al. |
| 2003/0014339 A1 | 1/2003 | Bush et al. |
| 2003/0191711 A1 | 10/2003 | Jamison et al. |
| 2004/0210520 A1 | 10/2004 | Fitzgerald et al. |
| 2005/0144126 A1 | 6/2005 | Commodore et al. |
| 2005/0222954 A1 | 10/2005 | Keown et al. |
| 2006/0143121 A1 | 6/2006 | Treider et al. |
| 2006/0247973 A1* | 11/2006 | Mueller ............ G06Q 30/0601 705/14.14 |
| 2006/0282381 A1 | 12/2006 | Ritchie |
| 2008/0052208 A1 | 2/2008 | Neece et al. |
| 2008/0201769 A1 | 8/2008 | Finn |
| 2009/0132347 A1* | 5/2009 | Anderson ............ G06Q 30/02 705/14.52 |
| 2010/0030675 A1 | 2/2010 | Hanan et al. |
| 2010/0223185 A1 | 9/2010 | Campbell et al. |
| 2010/0299248 A1* | 11/2010 | Burke ............... G06Q 20/02 705/39 |
| 2010/0312617 A1 | 12/2010 | Cowen |
| 2011/0154460 A1* | 6/2011 | Khare ............... H04L 9/3226 726/7 |
| 2011/0295745 A1 | 12/2011 | White et al. |
| 2013/0073309 A1 | 3/2013 | Ritchie |
| 2014/0067659 A1 | 3/2014 | Drake |
| 2014/0229382 A1 | 8/2014 | Fote |
| 2014/0297450 A1 | 10/2014 | Collett et al. |
| 2014/0337201 A1 | 11/2014 | Collett et al. |
| 2015/0081520 A1* | 3/2015 | Brereton ............ G06Q 30/0201 705/38 |
| 2015/0100491 A1 | 4/2015 | Fote |
| 2015/0254712 A1* | 9/2015 | Chen ............... G06Q 30/0255 705/14.53 |
| 2016/0066189 A1* | 3/2016 | Mahaffey .......... H04M 15/7652 455/405 |
| 2016/0253639 A1 | 9/2016 | Sharma |
| 2017/0061406 A1 | 3/2017 | Adams et al. |
| 2017/0308875 A1 | 10/2017 | O'Regan et al. |
| 2018/0068389 A1 | 3/2018 | Pessin |
| 2018/0150851 A1* | 5/2018 | Ouimet ............ G06Q 10/087 |
| 2018/0232715 A1 | 8/2018 | Continanza et al. |
| 2020/0320561 A1* | 10/2020 | O'Brien ............ G06Q 30/0239 |
| 2021/0019797 A1* | 1/2021 | Meyyappan ............ H04L 51/14 |

* cited by examiner

Credit Card Account (210)

| | |
|---|---|
| (211) Jan. 1, 2019 Grocery Store | $75.00 |
| (215) Current Balance | $75.00 |

| | |
|---|---|
| (212) Jan. 2, 2019 Dry Cleaner | $15.00 |
| (215) Current Balance | $90.00 |

| | |
|---|---|
| (213) Jan. 3, 2019 Restaurant | $40.00 |
| (215) Current Balance | $130.00 |

| | |
|---|---|
| (214) Jan. 4, 2019 Movie Theater | $20.00 |
| (215) Current Balance | $150.00 |

| | |
|---|---|
| (220) Jan. 5, 2019 Payment | -$250.00 |
| (215) Current Balance | -$100.00 |

| | |
|---|---|
| (230) Jan. 6, 2019 Transfer Out | $100.00 |
| (215) Current Balance | $0.00 |

Brokerage Account (250)

| | |
|---|---|
| (260) Jan. 1, 2019 Current Balance | $1,000.00 |

| | |
|---|---|
| (270) Jan. 6, 2019 Transfer In | $100.00 |
| (260) Current Balance | $1,100.00 |

| | |
|---|---|
| (280) Jan. 7, 2019 Transfer Reward | $5.00 |
| (260) Current Balance | $1,105.00 |

FIG. 2

Method (300)

Method (400)

Overpayment Notification 510

Application User Interface (500)

Overpayment Notification
Interface 530

Application
User Interface (500)

Offer Presentation Interface 540

Application
User Interface (500)

Offer Acceptance Interface 550

Application
User Interface (500)

SYSTEMS AND METHODS FOR OVERPAYMENT HANDLING

FIELD OF THE INVENTION

The following description relates to an overpayment handling system and a method for handling an overpayment.

BACKGROUND

In general, when a customer chooses to make a payment to his or her credit card or other revolving credit product, the customer incurs a balance on his or her account, which must be repaid. The customer may elect to repay the entire account balance immediately or by a set due date, or may elect to gradually repay the balance over time. In some instances, a customer may make a payment larger than his or her account balance, whether by mistake, due to the receipt of an account credit that reduces the balance, or other reason. A payment in excess of a customer's account balance (hereinafter referred to as an "overpayment"), may be considered a negative account balance, which may be held by the financial institution offering the credit product and applied to balances incurred in the future for a certain period of time. After that period of time elapses, the financial institution may return the remaining overpayment funds to the customer in the form of an issued check, a wire transfer, or some other means of funds transfer.

This approach causes inefficiencies for both the customer and the financial institution. The customer is deprived of the use of his or her funds during the holding period, and may receive little or no interest during the holding period. Further, the customer may be unable to apply the funds to better or more preferred uses during that time. The financial institution incurs administrative costs in handling the overpayment funds and offsetting future balances, and further costs in issuing a check, sending a wire transfer, and otherwise returning the funds. In addition, the financial institution forgoes an opportunity to help this customer direct his or her overpayment refund to better uses and possibly to convert a credit product customer to a savings and investment customer. These and other deficiencies exist.

SUMMARY OF THE INVENTION

Therefore, it is an object of the present disclosure to describe systems and methods for the efficient handling of overpayments in a manner that allows both customer and financial institutions to reduce costs and make more effective use of overpayment funds.

Embodiments of the present disclosure provide an overpayment handling system, comprising: an account database containing account information for one or more accounts associated with a user, wherein the one or more accounts include a first account associated with the user and the account information includes a balance reflecting liabilities for the first account; an offer database containing offer information, the offer information including one or more enhancements relating to one or more additional accounts, wherein the additional accounts including at least a second account; a server containing a processor, the processor configured to receive payment funds from the user and apply the payment funds to the balance of the first account; wherein, upon receiving payment funds that exceed the balance of the first account, the processor: applies a portion of the payment funds equal to the balance of the first account to the first account, retains the remaining portion of the payment funds, and queries the offer database for one or more enhancements applicable to the one or more additional accounts; wherein, upon receipt of one or more enhancements applicable to the one or more additional accounts in response to the query, the processor: generates one or more offers, each offer including one or more enhancements; applies a valuation model to the one or more offers and the remaining portion of the payment funds, the valuation model determining a value for each of the one or more offers, and selects the offer with the highest value for presentation to the user.

Embodiments of the present disclosure provide a method of handling an overpayment, comprising: receiving payment funds from a user, wherein the payment funds exceed an outstanding balance on a first account associated with a user; applying a portion of the payment funds to the first account, the portion of the payment funds equal to the outstanding balance, and retaining the remaining payment funds; obtaining one or more enhancements from an offer database containing at least one enhancement; generating one or more offers, each offer including one or more enhancements; determining a valuation of each of the one or more offers by applying a valuation model, the valuation model calculating the net present value of each of the one or more offers; ranking the one or more offers based on valuation; transmitting the highest-ranked offer for review by a user.

Embodiments of the present disclosure provide a method of presenting one or more account establishment offers, the method including: receiving payment funds from a user for application to a first account, the payment funds exceeding the liabilities applied to the first account; retaining the payment funds in excess of the liabilities and pending transactions; generating a plurality of account establishment offers, each account establishment offer including one or more enhancements; evaluating the plurality of account establishment offers using a valuation model, the valuation model calculating a net present value of each of the plurality of account establishment offers; ranking the plurality of account establishment offers in order of the highest net present value; and sequentially presenting each of the plurality of account establishment offers to a user associated with the first account, wherein the account establishment offers are presented in order of decreasing the net present value.

BRIEF DESCRIPTION OF THE DRAWINGS

FIG. 2 illustrates an overpayment and the handling of the overpayment according to an example embodiment.

DETAILED DESCRIPTION OF THE INVENTION

One aspect of the present disclosure is to provide systems and methods for handling overpayments in a cost effective process, in order to avoid issuing a check, electronic funds transfer, or other refund a customer for his or her overpayment. In another aspect of the present disclosure, the described systems and methods may present opportunities for customers to put overpayment funds to better use in savings, investments, or other purposes. The opportunities presented may be selected based on a customer's prior transactions, spending habits, and other activities to increase the likelihood the customer will accept the presented opportunity.

Figure 1:
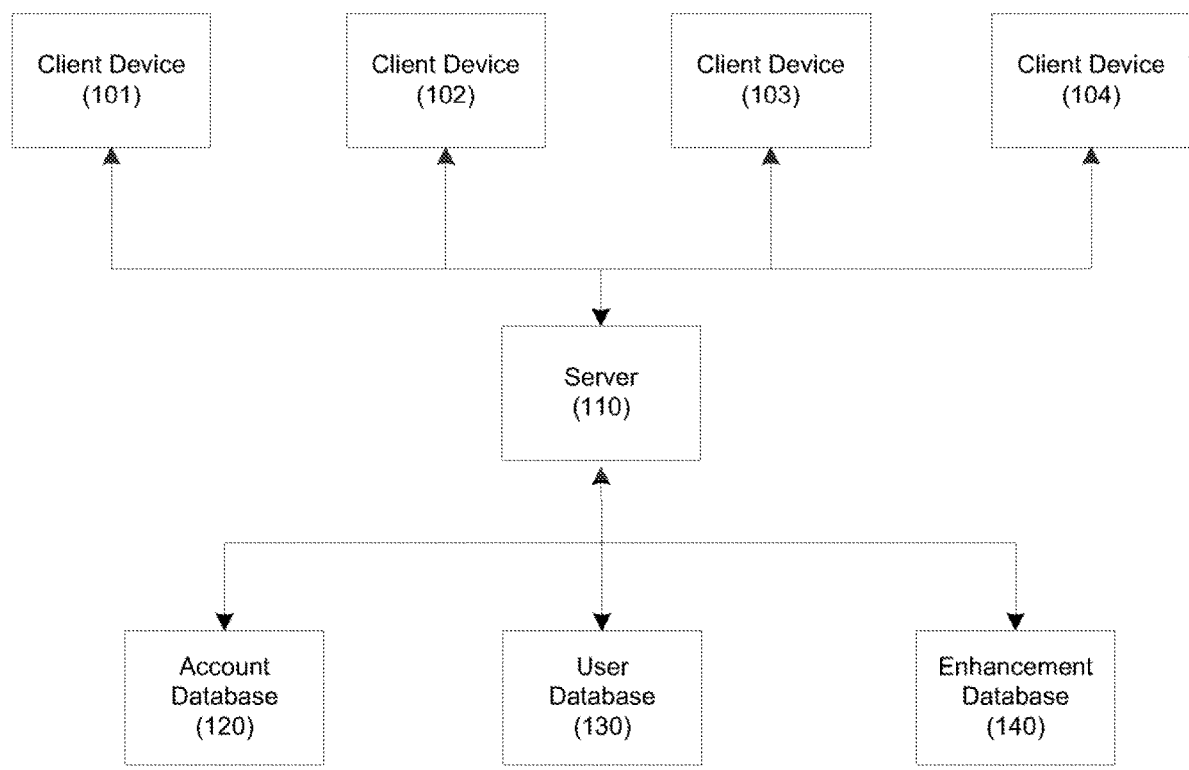
FIG. 1 illustrates an overpayment handling system according to an example embodiment.

FIG. 1 illustrates an overpayment handling system 100 as an example embodiment. In this embodiment, the system includes a plurality of client devices 101, 102, 103, 104 and a server 110 in data communication with an account database 120, a user database 130, and an enhancement database 140. As shown in FIG. 1, client device 101 may be a smartphone, client device 102 may be a laptop, client device 103 may be a desktop computer, and client device 104 may be a tablet computer. Client devices 101-104 are not limited to these examples, and may be any combination of smartphones, laptop computers, desktop computers, tablet computers, personal digital assistants, thin clients, fat clients, Internet browsers, or customized software applications. It is further understood that the client devices may be of any type of device that supports the communication and display of data and user input. While the example embodiment illustrated in FIG. 1 shows client devices 101-104, the present disclosure is not limited to a specific number of client devices, and it is understood that the system 100 may include a single client device or multiple client devices.

Client devices 101-104 may include a processor and a memory (not shown in FIG. 1). It is understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The memory may be a read-only memory, write-once read-multiple memory or read/write memory, e.g., RAM, ROM and EEPROM, and the client devices 101-104 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

Client devices 101-104 may further include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. The client devices 101-104 may also support a short-range wireless communication interface, such as near field communication, radio-frequency identification, and Bluetooth.

Client devices 101-104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the client devices that is available and supported by the client devices 101-104, such as a touch-screen, keyboard, mouse, cursor-control device, touch-screen, microphone, digital camera, video recorder or camcorder. These devices may be used to enter information and interact with the system 100 as described herein.

The server 110 may be a dedicated server computer, such as bladed servers, or may be personal computers, laptop computers, notebook computers, palm top computers, network computers, mobile devices, or any processor-controlled device capable of supporting the system 100. While FIG. 1 illustrates a single server 110, it is understood that other embodiments may use multiple servers or multiple computer systems as necessary or desired to support the users and may also use back-up or redundant servers to prevent network downtime in the event of a failure of a particular server.

The server 110 may be in data communication with client devices 101-104, account database 120, user database 130, and enhancement database 140 via a network, and the client devices 101-104 may also be in data communication with account database 120, user database 130, and enhancement database 140 via a network. In some examples, the network may be one or more of a wireless network, a wired network or any combination of wireless network and wired network. For example, the network may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network may include, without limitation, telephone lines, fiber optics, IEEE Ethernet 902.3, a wide area network, a wireless personal area network, a LAN, or a global network such as the Internet. In addition, the network may support an Internet network, a wireless communication network, a cellular network, or the like, or any combination thereof. The network may further include one network, or any number of the exemplary types of networks mentioned above, operating as a stand-alone network or in cooperation with each other. The network may utilize one or more protocols of one or more network elements to which they are communicatively coupled. The network may translate to or from other protocols to one or more protocols of network devices. Although the network is depicted as a single network, it should be appreciated that according to one or more examples, the network may comprise a plurality of interconnected networks, such as, for example, the Internet, a service provider's network, a cable television network, corporate networks, such as credit card association networks, and home networks.

The server 110 may store account database 120, user database 130, and enhancement database 140, or these may be hosted externally from the server 110. FIG. 1 illustrates the account database 120, the user database 130, and the offer database 140 as separate databases, but the present disclosure is not limited thereto. It is understood that the databases illustrated in FIG. 1 can be consolidated into a single database or spread across numerous databases or other forms of data organization and storage.

The account database 120 may be a relational or non-relational database, or a combination of more than one database. In an embodiment, the account database 120 may be stored by server 110, alternatively the account database 120 can be stored remotely, such as in another server, on a cloud-based platform, or in any storage device that is in data communication with server 110. The account database 120 may include user login credentials used to control access to user accounts. The login credentials may include, without limitation, user names, passwords, access codes, security questions, swipe patterns, image recognition, identification scans (e.g., driver's license scan and passport scan), device registrations, telephone numbers, email addresses, social media account access information, and biometric identification (e.g., voice recognition, fingerprint scans, retina scans, and facial scans).

The account database 120 is not limited to storing login credentials, and may contain data relating to the underlying account. For example, the account database 120 can include, without limitation, account identification information (e.g., account number, account owner identification number, account owner name and contact information), account characteristics (e.g., type of account, funding and trading limitations, and restrictions on access and other activity) balance information, payment history, and transaction history.

The user database 130 may be a relational or non-relational database, or a combination of more than one database. In an embodiment, the user database 130 may be stored by server 110, alternatively the user database 130 can be stored remotely, such as in another server, on a cloud-based platform, or in any storage device that is in data communication with server 110. The user database 130 may include information relating to users associated with one or more accounts. For example, the user database 130 may include the names, contact information (e.g., physical address, telephone number, email address), and login credentials of each user associated with one of more account provided by the financial institution. The user database 130 may also include the account number of each account associated with a user, a user identification number of each user, a listing and/or history of each account currently or previously maintained by the user at the financial institution. In addition, the user database 130 may contain a history of offers presented by the financial institution to the user, including without limitation offers to create new accounts, offers apply for a new financial products (e.g., a credit product), offers of pre-approved credit, and offers relating to the use of overpayment funds, along with the enhancements presented with these offers, if any.

Like the account database 120 and the user database 130, the enhancement database 140 may be a relational or non-relational database, or a combination of more than one database. In an embodiment, the enhancement database 140 may be stored by server 110, alternatively the offer database 140 can be stored remotely, such as in another server, on a cloud-based platform, or in any storage device that is in data communication with server 110. The enhancement database 140 may contain information relating to one or more enhancements that may be presented to the user in connection with an offer. As noted above, an offer may be presented to the user at any time, and offers may relate to, for example, the opening of new accounts, the application for credit or other products (including pre-approved offers of credit), and the application of overpayment funds.

Exemplary enhancements that can be stored in the enhancement database 140 include, without limitation, a reduced interest rate on liabilities, a suspension of interest on liabilities, an increased interest rate on account assets, a maintenance fee waiver, a transaction fee waiver, an expense fee waiver, a contribution, a matching contribution, a bonus percentage of assets transferred or funded, a fixed bonus amount, a bonus, an award of points to a loyalty program, a promotional item, and a promotional discount. In addition, each enhancement may be presented individually or in combination with one or more other enhancements, and each enhancement may be temporary or permanent in duration.

In an embodiment, the server 110 can recognize the receipt of an overpayment on an account associated with a user. The server can then determine whether to present an offer to the user relating to the use of those funds. This determination may be made immediately upon receipt of the overpayment or upon the completion of the holding period to account for any reduction in the overpayment amount due to offsetting transactions. Offers can be presented to the user at any time.

FIG. 2 illustrates a credit card account 210 associated with a user of a financial institution and a brokerage account 250 associated with the same user and hosted by the same financial institution, according to an example embodiment. As shown in FIG. 2, the credit card account 210 may include a plurality of transactions 211, 212, 213, and 214 and a current balance 215. Each of the transactions 211-214 may represent an instance of account spending, such as a purchase, an incoming balance transfer, or other debit incurred to the credit card account 210. Each transaction incurring a debit to the credit card account 210 may be viewed as a creating a positive current balance 215. The current balance 215 may be updated on a rolling basis with each transaction.

The credit card account 210 may further include an overpayment 220, show in FIG. 2 as a payment in excess of the current balance 215. The overpayment 220 causes the current balance 215 to turn negative, which indicates that the user has paid more than total debits currently on the credit card account 210.

Upon detection of the negative current balance 215, the user may be presented with an offer proposing a different use for the overpayment funds. In the example illustrated in FIG. 2, the different use for the overpayment funds may be to transfer the overpayment funds to the user's brokerage account 250. In this example, the offer includes an enhancement to encourage the user transferring the overpayment funds in the form of an additional reward contribution to the brokerage account 250 equal to 5% of the transferred funds.

As shown in FIG. 2, the brokerage account 250 may include a current balance 260, and this current balance may be updated on a rolling basis in response to activity on the brokerage account 250. Upon receipt of the overpayment funds transfer 270 from the credit account 210, the current balance 260 of the brokerage account 250 may be increased by the amount of the transfer. The current balance 260 may be further increased by the deposit of the offer enhancement transfer reward 280 into the brokerage account 250, in accordance with the terms of the offer made to the user.

Accordingly, the offer may incentivize the user to put the excess funds to use in the brokerage account 250 for purposes of, e.g., investment or earning interest, instead of leaving the overpayment funds in the credit card account 210 or request a refund. The user's acceptance of the offer allows the financial institution to retain the overpayment funds instead of refunding the funds to the user and incurring costs associated with processing the refund. The financial institution gains the benefit of additional funds from the user in an institution brokerage account and the possibility of making additional money from the handling and investment of these funds.

For purposes of illustration, it is assumed that the credit card account 210 illustrated in FIG. 2 entered Jan. 1, 2019 with a current balance 215 of $0.00. However, it is understood that the present disclosure is not limited thereto, and current balance 215 can reflect an amount carried over from a previous month without changing the principles of operation discussed herein. It is further understood that the dates shown in FIG. 2 are exemplary and not intended to depict any particular timing of account activity.

Figure 3:
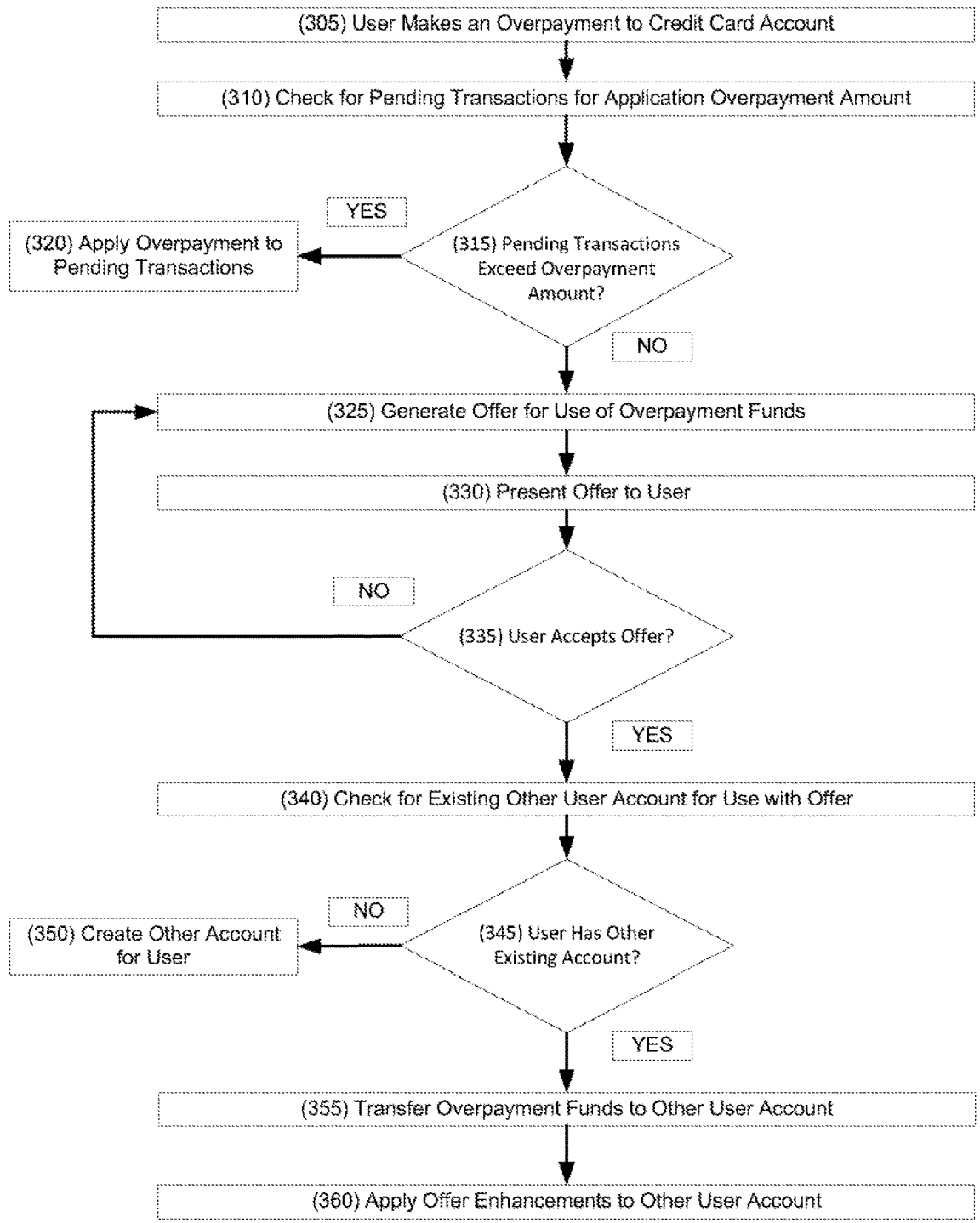
FIG. 3 is a flow chart illustrating a method of handling an overpayment according to an example embodiment.

FIG. 3 illustrates a method 300 of handling an overpayment according to an example embodiment. FIG. 3 may reference the same or similar components of the overpayment handling system 100 but is not limited thereto.

The method 300 may commence in step 305, where the user may make an overpayment to a credit card account. Upon receipt of any payment, the server may check to see if the amount of funds is in excess of the current balance of the credit card account. If the payment received exceeds the current balance, the system may determine that an overpayment has been made.

Following the determination that an overpayment has been made, the server may check for pending transactions that have not yet been added to the current balance of the credit card account in step 310. Pending transactions can include any purchase or other account activity that has occurred but has not yet been reflected in the current balance, for any reasons. If the server determines that pending transactions exist, the method 300 may advance to step 315, and if the server determines that there are no pending transactions, the method 300 may advance directly to step 320.

In step 315 the server determines the dollar amount of all pending transactions for the credit card account. If this amount exceeds the amount of the overpayment, the "YES" option is taken at step 315 and the method 300 proceeds to step 320 where the overpayment amount may be applied to the pending transactions. In this case, the method 300 concludes with no further action taken after step 320. If the server determines that the dollar amount of all pending transactions does not exceed the overpayment amount, method 300 may proceed to step 325. In some examples, the determination made in step 315 may find pending transactions exist totaling an amount less than the overpayment funds. In these examples, a portion of the overpayment funds may be applied to satisfy the amount owed on the pending transactions, before the method proceeds to step 325 to handle the remaining portion of the overpayment.

In step 325, server may generate an offer relating to the use of funds. The offer may present the user with the option of transferring the overpayment funds from the credit card account to another account associated with the user. Exemplary other accounts include, without limitation, a savings account, a certificate of deposit, a brokerage account, a retirement savings or other tax-advantaged account, a mortgage account, a credit account, a debit account, a loan account, and other financial accounts. In some examples, the offer may present the user with the opportunity to obtain a credit or loan product, such as a personal loan, an automobile loan, a home loan, a home equity loan, or other financial product. In some examples, the offer may present the user with the opportunity to invest in a product, offering, or security arranged by the financial institution hosting the credit account or one of its affiliates, such as a mutual fund, exchange traded fund, stock offering, bond offering, real estate offering, or other investment or purchase opportunity. In some examples, the offer may further include one or more temporary or permanent enhancements to provide an incentive for the user to accept the offer. Exemplary enhancements include, without limitation, a reduced interest rate on liabilities, a suspension of interest on liabilities, an increased interest rate on account assets, a maintenance fee waiver, a transaction fee waiver, an expense fee waiver, a contribution, a matching contribution, a bonus percentage of assets transferred or funded, a fixed bonus amount, a bonus, an award of points to a loyalty program, a promotional item, and a promotional discount.

In step 330, the offer may be presented to the user. This may be done in a variety of ways, such as via a pop-up notification or message sent to one or more client devices associated with the credit card account and/or the user, a notification within a software application created by or affiliated with the financial institution that has been installed in one or more client devices associated with the credit card account and/or the user, a message presented via a webpage that allows the user to access, manage, or view the credit card account, a telephone call made to a telephone number associated with the credit card account and/or the user, a text message (SMS or MMS) sent to a telephone number associated with the credit card account and/or the user, an email sent to an email address associated with the credit card account and/or the user, or other known method employing contact information associated with the credit card account and/or associated with the user. In some examples, the presentation of the offer may allow the user to accept the offer, decline the offer, view additional information relating to the offer, and asks questions and request additional information regarding the offer.

In step 335, the user may accept or decline the offer. If the user declines, the offer the "NO" option of step 335 may be selected. In some examples, the method 300 may then return to step 325 and generate another offer for presentation to the user, and this process may continue until the user accepts an offer at step 335 or the overpayment funds are other dissipated (by, e.g., application to subsequent pending transactions or return to the user). In some examples, the method 300 may present a new offer to a user a predetermined number of times or a predetermined number of times per instance of overpayment. In other examples, no further action may be taken, and the method 300 may end after the user declines the offer.

If, in step 335, the user accepts the offer, the method 300 may select the "YES" option and proceed to step 340. In step 340, the server may check for an existing account associated for the user (the "other user account" referenced in FIG. 3) to receive a transfer of the overpayment funds. The other user account can be any financial account associated with the user, such as the exemplary accounts listed above. In step 345, a determination is made as to whether a suitable other account exists. If no such other user account exists, the method 300 may select the "NO" option and proceed to step 350 where a suitable other user account may be created for the user. In some examples, the offer may involve the creation of a new financial product, e.g., a new loan, and in those examples the new financial product may be created in step 350.

If a suitable other account exists, the method 300 may select the 'YES" option in step 345 and proceed to step 355 where the overpayment funds may be transferred from the credit card account to the other user account. If, as in some examples, the offer involved the purchase of an additional financial product or related transaction, those actions may be performed upon completion of the transaction. The method 300 may then proceed to step 360 where the enhancements included in the offer may be applied. Depending upon the particular enhancements offered and scope thereof, the application of the enhancements may affect the other user account and as well as additional accounts associated with the user.

Figure 4:
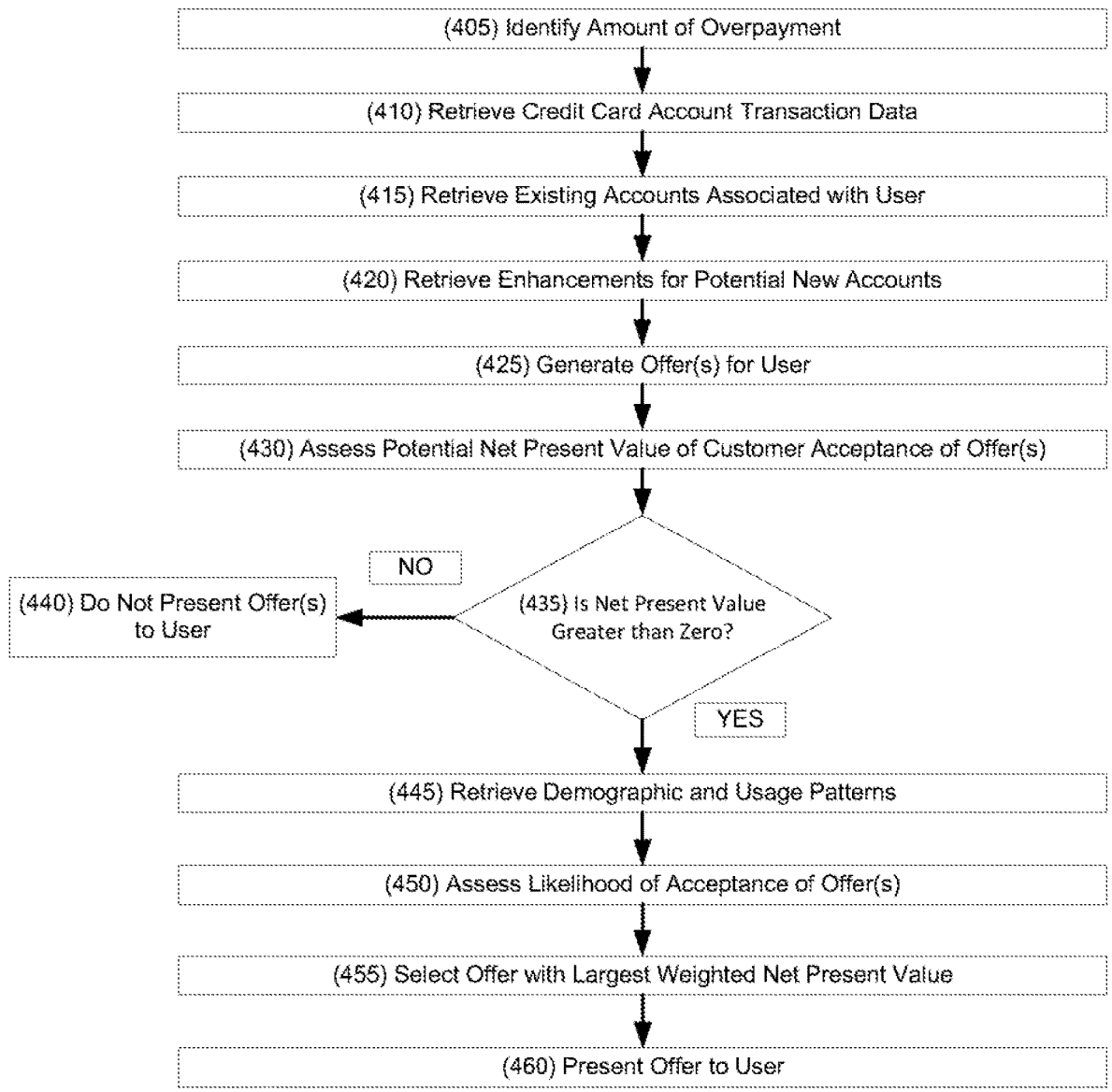
FIG. 4 is a flowchart illustrating a method of generating an offer according to an example embodiment.

FIG. 4 illustrates a method 400 of generating an offer according to an example embodiment. FIG. 4 may reference the same or similar components of the overpayment handling system 100 but is not limited thereto. Method 400 may commence in step 405 by identifying that an overpayment has been made to a credit card account associated with a user. The amount of the overpayment may also be ascertained.

Next, a series of data retrieval steps 410, 415, and 420 may be performed. Specifically, in step 410, the method 400 may again query the account database and obtain the transaction history of the credit card account. In step 415, the method 400 may query the account database and obtain a listing of all accounts associated with the user along with account information for each account. In step 420, the method 400 may query the enhancement database to retrieve a listing of the enhancements available for use with the offer to be generated. Optionally, in step 420, the method 400 may also query the user database to determine enhancements previously included in offers presented to the user and the user's response to the offers including those enhancements. It is understood that the order of the data retrieval steps shown in FIG. 4 is exemplary, and that this data may be retrieved in any suitable order or manner as long as the data retrieval is completed prior to the offer generation performed in step 425.

In step 425, one or more offers may be generated for the user's review. In generating the offer, the method 400 may assess the data retrieved to formulate an offer that the user may be willing to accept. The retrieved data may be useful in assessing the available accounts, available enhancements, the user's transaction history (e.g., spending volumes and history of overpayments), and the user's previous history of offers and enhancements in preparing one or more offers. Using the same information, the method 400 may assess the retrieved enhancements and may incorporate one or more enhancements into each generated offer.

Once the one or more offers are prepared, the method 400 may proceed to step 430 and assess the net present value of each prepared offer if accepted by the user. As used herein, the term "net present value" means the summation of the present value of the profits related to the offer, i.e., the revenues gained by the financial institution by making this offer less the present values of the costs incurred by the financial institution in connection with this offer (e.g., by offering one or more enhancements). In some examples, the net present value may calculated by a valuation model. For example, the valuation model may incorporate one or more machine learning techniques, such as gradient boosting machine, logistic regression, and neural networks. In some examples, the valuation model may be built from data collected regarding one or more previous offers that have been presented, and the decisions made to accept or decline the previous offers. The valuation model may be built with offers made to solely to the user decisions made solely by the user, offers made to one or more other users, and decisions made by one or more other users, or a combination thereof. By calculating the net present value of each offer, the method 400 may determine the benefit of presenting one or more offers to the user.

Once the net present value calculations are completed, the method may proceed to step 435 and determine whether each offer has a net present value greater than zero. If an offer has a net present value that is equal to or less than zero, the "NO" option be selected and the method 400 may proceed to step 440 where the offer is not presented to the user. For offers having a net present value greater than zero, the method 400 may select the "YES" proceed to step 445.

In step 445, the method 400 may retrieve demographic and usage information for the user from the account database and the user database. The retrieved information may include, without limitation, user account activity, prior spending and transaction history, prior funds transfers, frequency of overpayments, frequency of late payments, income, liabilities, credit score, credit history, net assets, and demographic characteristics such as the user's location and age. This information may be utilized to determine an offer that the user may be likely to accept. For example, a user that makes frequent overpayments to a credit card account may be receptive to an offer to establish a savings account or a brokerage account, to earn a greater return on the overpayment funds.

Next the method 400 may proceed to step 450 and assess the likelihood of the user's acceptance of each generated offer using the retrieved demographic and usage information. The likelihood of acceptance may be expressed as a percentage (e.g., 20%). In some examples, the likelihood of accept may be calculated using modeling techniques similar to those described with respect to the valuation model. For example, the likelihood of acceptance modeling may utilize the acceptance or decline of other offers by the user, other users, and a combination thereof. In some examples, machine learning models may be employed based on techniques such as gradient boosting machine, logistic regression, and neural networks.

The likelihood of acceptance calculated in step 450 may be used in the next step, when the method 400 selects the offer with the largest weighted net present value for presentation to the user. The weighted net present value may be calculated by multiplying the net present value (calculated in step 430) by the likelihood of acceptance (calculated in step 450). The method 400 may rank the offers based on the weighted net present value and may select the offer with the greatest weighted net present value for presentation to the user. This offer may be presented to the user in step 460.

In some examples, the method 400 may conclude with the presentation of the offer having the greatest weighted net present value to the user. In other examples, if the user declines that offer, the method 400 may subsequently present the offer having the second greatest weighted net present value to the user. This process may be repeated a predetermined number of times, until the user accepts an offer, or until all offers having a net present value greater than zero have been presented.

Thus, the method 400 may assemble and analyze a range of data from several databases in preparing offers and enhancements for the users, and identify the offers and enhancements that may appeal to the user and may be most likely for the user to accept. In addition, the method 400 may prevent the financial institution from presenting an offer to the user that is not beneficial for the financial institution (i.e., with a net present value less than zero).

For purposes of illustration, an exemplary embodiment of the generation and assessment of potential offers may now be described. In this example, a user may have a credit card account, and may make an overpayment in excess of any pending transactions in the amount of $100. Upon recognition of the overpayment, the overpayment handling system may begin the process of generating an offer. Initially, the overpayment handling system may determine that the user has a credit card account with the financial institution and no other accounts or financial products, but is eligible for a savings account and a brokerage account based on information retrieved from the account database and the user database.

The overpayment handling system may then assess the enhancements available from the enhancements database that can be included with offers for the user to open a savings account and a brokerage account. For example, an offer to open a savings account may be enhanced with a matching contribution of a certain percentage of deposited assets, and an offer to open a brokerage account may be enhanced with a waiver of brokerage fees for six months after opening the account.

In view of the user's transaction and payment activity on his or her credit card account, the overpayment handling system 100 may apply a valuation model that models the NPV for both the saving account and the brokerage account. For example, the valuation model may predict a net present value for the savings account offer is $200 and the net present value for the brokerage account offer is $250.

Since both the savings account and the brokerage account offers have a net present value greater than zero, the weighted net present value of each offer may be calculated. The user's demographic and usage patterns may be retrieved and a likelihood of acceptance should be calculated for each offer. For example, the likelihood of the user accepting the savings account offer may be assessed at 20% and the likelihood of the user accepting the brokerage account offer may be assessed at 10%. The weighted net present value of each offer may now be calculated by multiplying the net present value by the likelihood of acceptance:

Savings Account Offer Weighted Net Present Value=$200*20%=$40

Brokerage Account Offer Weighted Net Present Value=$250*10%=$25

Since the savings account offer has a higher weighted net present value than then brokerage account offer, the savings account offer may be presented to the user via, e.g., email. If the user accepts the savings account offer, a new savings account may be created for the user and the overpayment funds, along with the matching contribution, may be deposited into the savings account.

FIGS. 5A-5E illustrate a series of application user interfaces of a user's client device according to example embodiments. The application user interface 500 shown in these figures may be displayed on a smartphone, tablet computer, laptop computer, desktop computer, or any other client device where a credit management application has been installed or can be deployed. In an embodiment, the application user interface 500 may be adapted to a mobile client device, including a smart phone and a tablet computer. In another embodiment, the application user interface 500 may be adapted to a client device with more system resources, including a laptop computer or desktop computer. In another embodiment, the application user interface 500 may be adapted for viewing by a web browser.

Figure 5A:
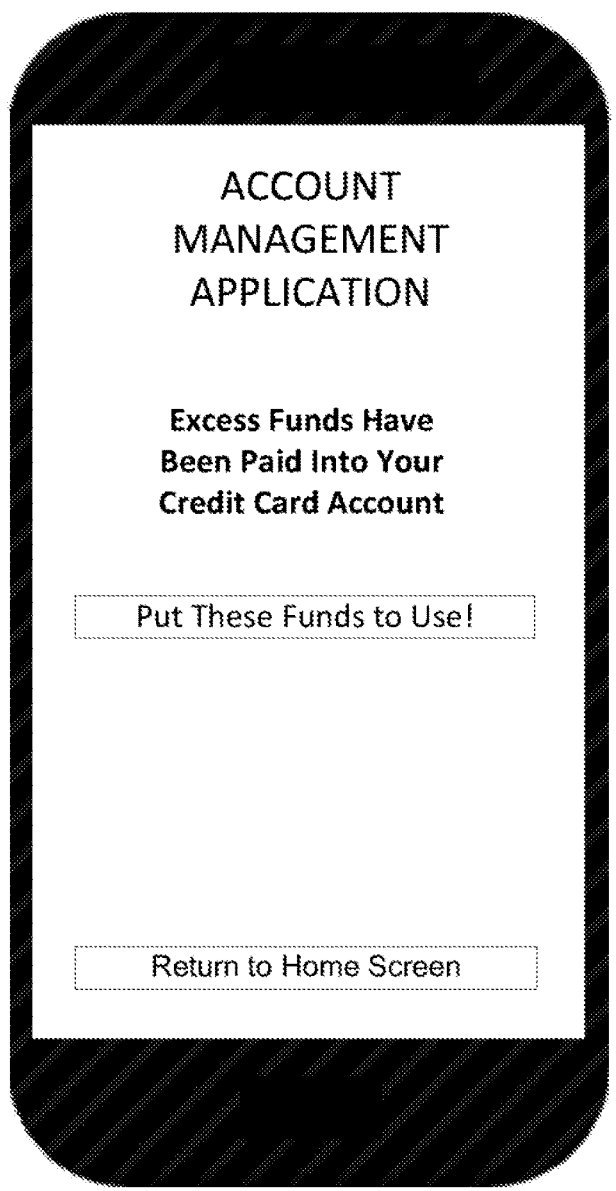
FIGS. 5A-5E illustrate a series of application user interfaces according to example embodiments.

As shown in FIG. 5A, the application interface 500 may present an overpayment notification 510 on the display of the user's client device. The overpayment notification 510 may inform the user that they have made an overpayment to the credit card account, and may prompt the user to put the excess funds to user. By selecting this prompt, a login interface may be displayed. Alternatively, the user may disregard this notification and return to the application home screen or exit the application.

Figure 5B:
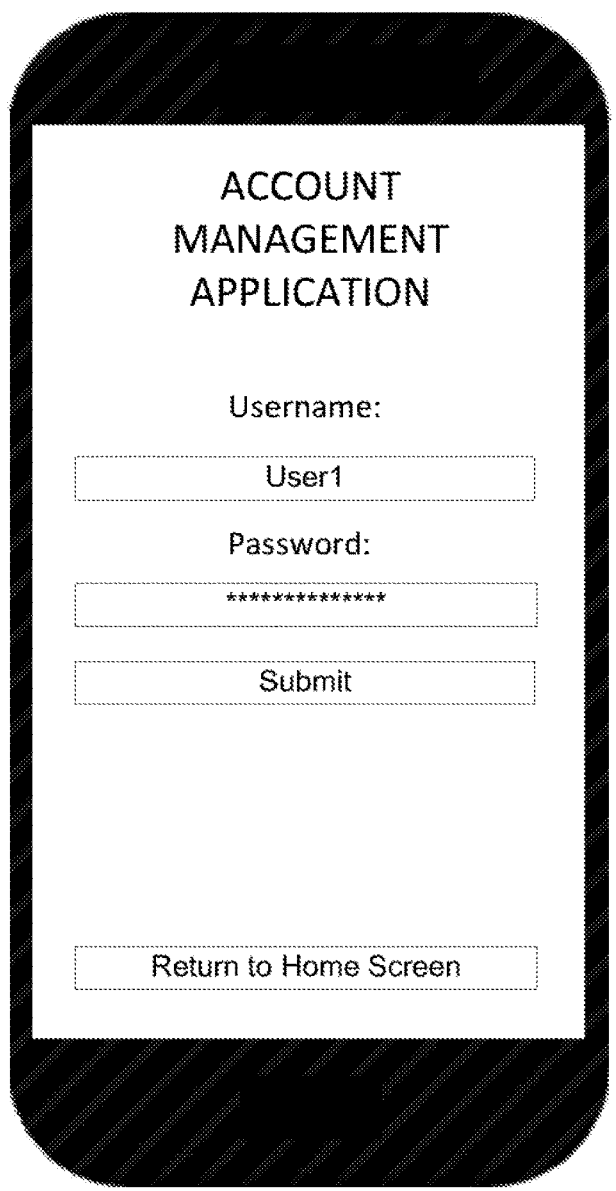

As shown in FIG. 5B, the application user interface 500 may present a login interface 520 on the display of the user's client device. The login interface 520 may allow the user to access account information by the submission of a password as illustrated, or by another known authentication method. In some examples, authentication may be required before a user is permitted to view an offer and take action to accept the offer or decline the offer. Alternatively, the login interface 520 may be displayed after the user is initially presented with the terms of an offer but before the decision to accept or decline the offer is submitted, or the login interface 520 may be displayed immediately after the decision to accept or decline the offer is submitted as a means of verification.

Figure 5C:
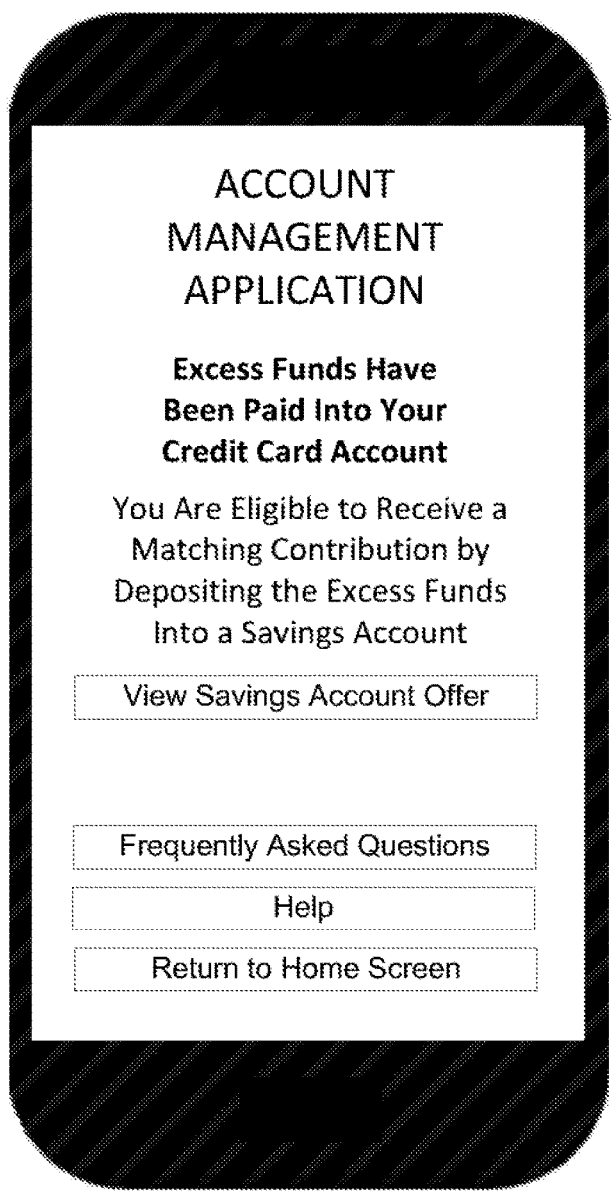

As shown in FIG. 5C, the application user interface 500 may present an overpayment notification interface 530 on the display of the user's client device. The overpayment notification interface 530 may explain that an overpayment has been made for the user's credit card account and that an offer to deposit the overpayment funds into a savings account and receive a matching contribution is available. The overpayment notification interface 530 may present the user the options to view the offer in detail, view frequently asked questions, obtain customer service help, or decline the offer by returning to the application home screen. If the user elects to view the savings account offer, an offer presentation interface may be displayed.

Figure 5D:
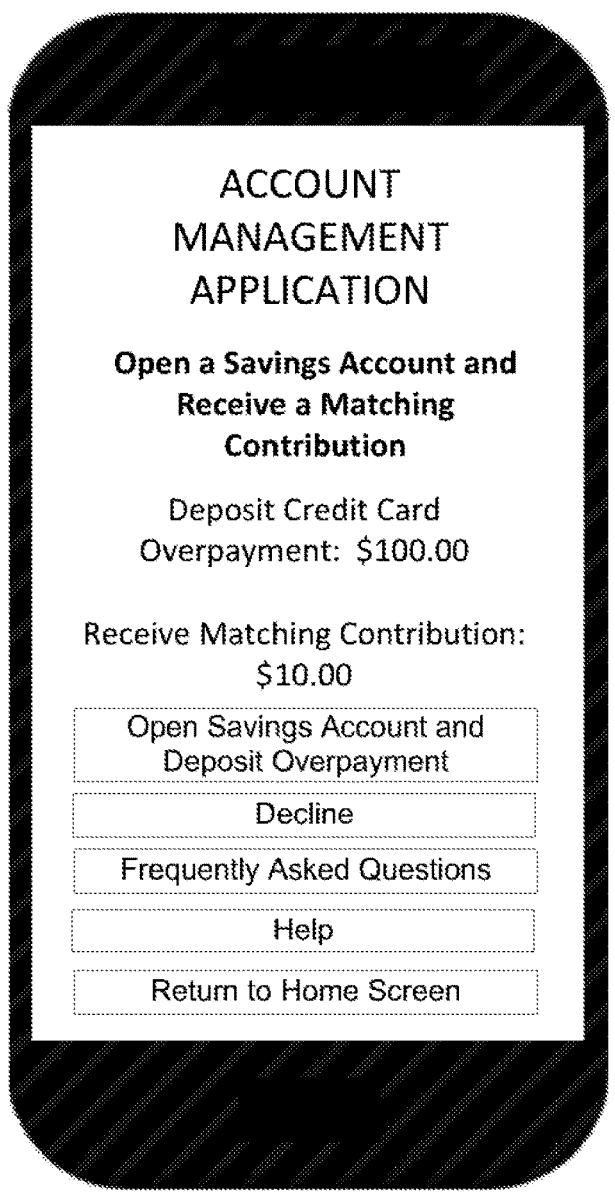

As shown in FIG. 5D, the application user interface 500 may present an offer presentation interface 540 on the display of the user's client device. The offer presentation interface 540 may present the details of the offer, e.g., if the user elects to open a savings account and deposit the credit card overpayment funds, a matching contribution will also be deposited to the savings account. The offer presentation interface 540 may present the user the options to accept the offer, decline the offer, view frequently asked questions, obtain customer service help, or decline the offer by returning to the application home screen. If the user elects to accept the savings account offer, an offer acceptance interface may be displayed.

Figure 5E:
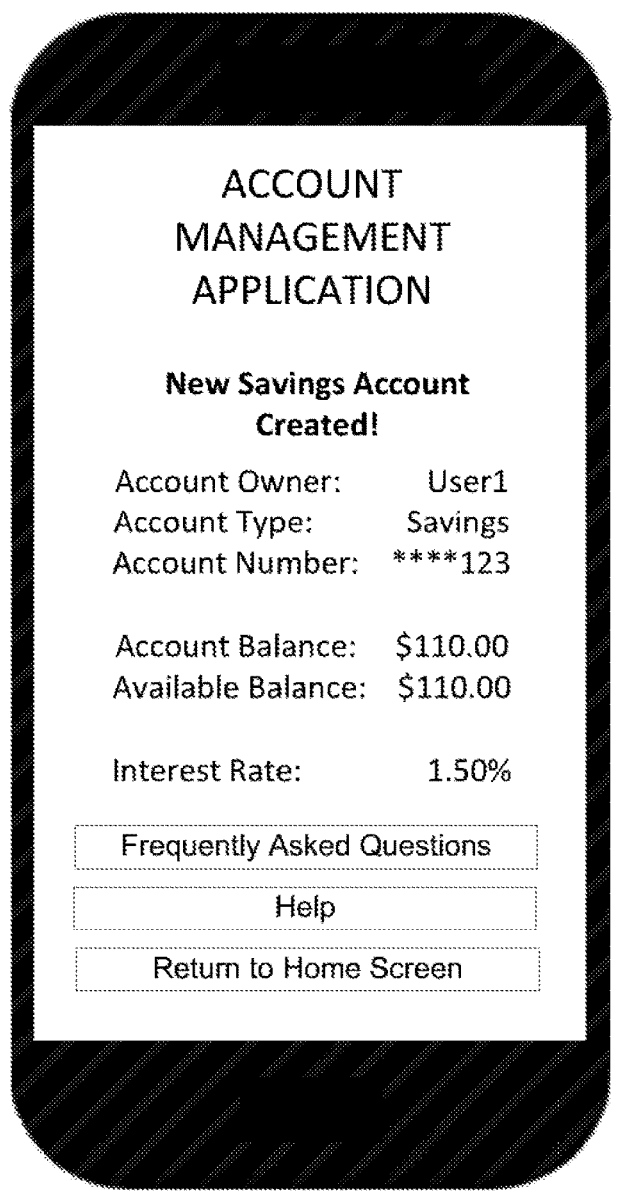

As shown in FIG. 5E, the application user interface 500 may present an offer acceptance interface 550 on the display of the user's client device. The offer acceptance interface 550 may present the details related to the user's acceptance of the offer, e.g., details relating to the newly established savings account, such as the account name, type, and number, the account balance and the balance available for withdrawal, and the interest rate. The offer acceptance interface 550 may also present the user with the options to view frequently asked questions, obtain customer service help, or return to the application home screen.

In some examples, a credit card account may be identified as the account receiving an overpayment and savings accounts and brokerage accounts may be identified as the accounts that are created and/or receive a transfer of overpayment funds and one or more enhancements, however, the present disclosure is not limited thereto. It is understood that the present disclosure are not limited to certain types of accounts, and the present disclosure includes, without limitation, financial accounts (e.g., savings, checking, credit card, debit card, mortgage, loan, brokerage, retirement, cryptocurrency accounts), entertainment accounts (e.g., video streaming, gaming and entertainment), accounts used for holding commercially valuable content (e.g., data backups, music and video content, and digital archives), service accounts (e.g., utilities and home security accounts, merchant or retailer accounts, online shopping accounts, and customer loyalty and rewards accounts), and others.

In some examples a financial institution may be identified as hosting the account receiving an overpayment or hosting the account being created and/or receiving the transferred overpayment funds, however, the present disclosure is not limited to financial institutions. It is understood that the present disclosure includes accounts of any type, hosted by any institution, financial or otherwise. In addition, the account receiving an overpayment and the account being created and/or receiving the transferred overpayment funds are not required to be hosted or affiliated with the same institution.

In some examples, offers may be communicated to one or more client devices associated with account receiving the overpayment or the user of the account receiving the overpayment. The user's decision to view offer details, accept an offer, or decline an offer, in response to one communication may be effective for all communications sent regardless of client device or communication method.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. An overpayment handling system, comprising:
   an account database containing account information for one or more accounts associated with a user, wherein the one or more accounts include a first account associated with the user and the account information includes a balance reflecting liabilities for the first account;
   an offer database containing offer information, the offer information including one or more enhancements relating to one or more additional accounts, wherein the additional accounts including at least a second account;
   a server containing a processor, the processor configured to receive payment funds from the user and apply the payment funds to the balance of the first account; and
   an application user interface, wherein the application user interface is configured to authenticate a user, display an offer, and receive user input;
   wherein, upon detecting receipt of payment funds that exceed the balance of the first account, the processor:
      applies a portion of the payment funds equal to the balance of the first account to the first account,
      retains the remaining portion of the payment funds,
      queries the offer database for one or more enhancements applicable to the one or more additional accounts, and
      determines whether any of the one or more enhancements were included in one or more previous offers to the user and one or more responses by the user to the one or more previous offers;
   wherein, upon receipt of one or more enhancements applicable to the one or more additional accounts in response to the query, the processor:
      generates one or more offers, each offer including one or more enhancements,
      determines a net present value for each of the one or more offers, wherein the net present value comprises a summation of the present values of revenues gained by the offer less a summation of the present values of cost incurred by the offer,
      applies an acceptance model to the one or more offers to determine the user's probability of acceptance of the one or more offers, wherein:
         the acceptance model comprises a machine learning model built on a dataset comprising the plurality of decisions by the user associated with the plurality of previous offers and a plurality of decisions by a plurality of other users, and
      weights each of the one or more offers based on the net present value and the probability of acceptance,
      ranks the one or more offers in order of the highest weighted net present value, and
      transmits the offer with the highest weighted net present value for presentation to the user application user interface for display to the user; and
   wherein the application user interface is configured to:
      receive a biometric user input to authenticate the user prior to displaying the offer, and
      receive a user decision in response to the offer.

2. The overpayment handling system of claim 1, wherein a valuation model calculates the net present value based on a projected profit from the offer.

3. The overpayment handling system of claim 1, further comprising a user database, wherein:
   the user database includes financial information and demographic information relating to the user, the financial information including at least one of income, liabilities, credit score, credit history, purchase history, and net assets, and the demographic information includes user age and user location, and
   the user's probability of acceptance is determined based on at least one of the financial information and the demographic information.

4. The overpayment handling system of claim 1, wherein upon calculating a negative net present value for the offer with the highest valuation, the processor does not generate an offer.

5. The overpayment handling system of claim 1, wherein the enhancements include at least one selected from the group of a reduced interest rate on liabilities, a suspension of interest on liabilities, an increased interest rate on account assets, a maintenance fee waiver, a transaction fee waiver, an expense fee waiver, a contribution, a matching contribution, a bonus percentage of assets transferred or funded, a fixed bonus amount, a bonus, an award of points to a loyalty program, a promotional item, and a promotional discount.

6. The overpayment handling system of claim 1, wherein the one or more additional accounts include at least one account associated with the user and at least one account not associated with the user.

7. The overpayment handling system of claim 1, wherein the server transmits the offer via at least one selected from the group of an email sent to an email address associated with the user, a text message sent to a telephone number associated with the user, a notification on a client device associated with the user, a message sent to an application installed on the client device associated with the user, a call placed to a telephone number associated with the user, and a letter sent to an address associated with the user.

8. The overpayment handling system of claim 7, wherein the offer transmitted by the server includes an option for the user to accept the offer and an option for the user to deny the offer.

9. The overpayment handling system of claim 8, wherein the user decision comprises an acceptance of the offer from the user, the server establishes a second account associated with the user and applies the one or more enhancements included in the offer to the second account.

10. The overpayment handling system of claim 8, wherein additional information is required to establish the second account, and the server requests the additional information from the user.

11. The overpayment handling system of claim 8, wherein upon receipt of a denial of the offer from the user, the server:
  selects a second offer relating to the remaining portion of the funds, the offer having the second-highest valuation, and
  transmits the second offer via at least one selected from the group of an email sent to an email address associated with the user, a text message sent to a telephone number associated with the user, a notification on a client device associated with the user, a message sent to an application installed on the client device associated with the user, and a call placed to a telephone number associated with the user.

12. The overpayment handling system of claim 1, wherein the processor applies a valuation model to each of a plurality of offers and ranks each of the plurality of offers based on the value.

13. A method of handling an overpayment, comprising:
  receiving payment funds from a user; and
  upon detecting that the payment funds exceed an outstanding balance on a first account associated with the user:
    applying a portion of the payment funds to the first account, the portion of the payment funds equal to the outstanding balance, and retaining the remaining payment funds;
    obtaining one or more enhancements from an offer database containing at least one enhancement;
    determining whether any of the one or more enhancements were included in one or more previous offers to the user and one or more responses by the user to the one or more previous offers;
    generating one or more offers, each offer including one or more enhancements;
    determining a net present value of each of the one or more offers, wherein the net present value comprises a summation of the present values of revenues gained by the offer less a summation of the present values of cost incurred by the offer;
    determining a probability of acceptance by the user for each of the plurality of account establishment offers by applying an acceptance model, the acceptance model calculating a probability of acceptance by the user for each of the plurality of account establishment offers, wherein:
      the acceptance model comprises a machine learning model built on a dataset comprising the plurality of decisions by the user associated with the plurality of previous offers and a plurality of decisions by a plurality of other users;
    weighting each of the plurality of account establishment offers based on the net present value and the probability of acceptance;
    ranking the one or more offers based on weighted net present value;
    transmitting the highest-ranked offer for presentation by an application user interface to a user;
    receiving a biometric user input;
    authenticating the user based on the biometric user input;
    displaying the highest-ranked offer; and
    receiving a user decision in response to the highest-ranked offer.

14. The overpayment handling method of claim 13, wherein in determining net present value, a valuation model considers expected profit and at least one of financial information relating to the user and demographic information relating to the user.

15. The overpayment handling method of claim 14, wherein the valuation model utilizes machine learning by applying at least one algorithm selected from the group of gradient boosting machine, logistic regression, and neural networks.

16. The overpayment handling method of claim 13, wherein the user decision comprises an indication of acceptance of the offer, further including:
  establishing a second account associated with the user,
  depositing the remaining payment funds in the second account, and
  applying the one or more enhancements included in the offer to the second account.

17. The overpayment handling method of claim 13, wherein the offer involves the application of an enhancement to a second account associated with the user.

18. The overpayment handling method of claim 13, wherein the one or more offers includes a first offer, the first offer having the highest rank and having been transmitted to the user, and a second offer having the second-highest rank, and wherein the user decision comprises an indication of denial of the offer, the method further including:
  receiving an indication of denial of the first offer from the user, and
  transmitting the second offer for review by the user.

19. A method of presenting one or more account establishment offers, the method including:
  receiving payment funds from a user for application to a first account; and
  upon detecting that the payment funds exceed a total of liabilities and pending transactions applied to the first account:
    retaining the payment funds in excess of the liabilities and pending transactions;
    generating a plurality of account establishment offers, each account establishment offer including one or more enhancements;
    determining whether any of the one or more enhancements were included in one or more previous offers to the user and one or more responses by the user to the one or more previous offers;
    evaluating the plurality of account establishment offers to determine a net present value, wherein the net present value comprises a summation of the present values of revenues gained by the offer less a summation of the present values of cost incurred by the offer;
    evaluating the plurality of account establishment offers using an acceptance model, the acceptance model calculating a probability of acceptance by the user for each of the plurality of account establishment offers, wherein:
the acceptance model comprises a machine learning model built on a dataset comprising the plurality of decisions by the user associated with the plurality of previous offers and a plurality of decisions by a plurality of other users;
weighting each of the plurality of account establishment offers based on the net present value and the probability of acceptance;
ranking the plurality of account establishment offers in order of the highest weighted net present value; and
sequentially presenting each of the plurality of account establishment offers to a user associated with the first account, wherein:
the account establishment offers are presented in order of decreasing weighted net present value, and
an application user interface is configured to authenticating the user based on the biometric user input, present of each of the plurality of account establishment offers, and receive a user decision.

20. The method of presenting an account establishment offer of claim 19, further including:
receiving an indication of acceptance of one of the plurality of account establishment offers from the user;
ceasing the presentation of the account establishment offers;
establishing a second account associated with the user;
depositing the retained payment funds in the second account; and
applying the plurality of enhancements included in the accepted account establishment offer to the second account.

* * * * *